United States Patent Office 3,110,560
Patented Nov. 12, 1963

3,110,560
PREPARATION OF ALKALINE EARTH METAL PHOSPHATES
Peter Whitten Ranby and Henry Leonard Burrus, London, England, assignors to Thorn Electrical Industries Limited, London, England, a British company
No Drawing. Filed July 12, 1960, Ser. No. 42,234
Claims priority, application Great Britain July 13, 1959
7 Claims. (Cl. 23—109)

The present invention concerns the preparation of the phosphates of metals of the group comprising magnesium, calcium, strontium, barium, cadmium and manganese, and more especially the monoacid phosphates of calcium, strontium and barium.

Calcium hydrogen phosphate is widely used in the manufacture of luminescent materials such as calcium halophosphates, orthophosphates and pyrophosphates, providing as it does a convenient source of both calcium and phosphate ions. The interactions between the various solid components of a mixture of starting materials which occur when the mixture is heated to form a luminescent material affect the nature of the final product, and it is essential that the components should be correctly present in the required form and concentration if the luminescent properties of the product are to be at a maximum. As calcium hydrogen phosphate is usually the major component of such mixtures, the form in which it is present is extremely important. Similar considerations apply mutatis mutandis to the use of strontium and barium hydrogen phosphates and the other bivalent metal phosphates in the preparation of luminescent materials.

Precipitation of calcium hydrogen phosphate by the addition of a purified aqueous solution of, say, ammonium phosphate to a purified aqueous solution of a calcium salt such as the chloride or nitrate gives rise to variations in the nature of the final product owing to the manner in which the two reactant solutions are brought together, one or other being in temporary local excess at different points within the reaction mixture. Reaction of calcium carbonate with the calculated quantity of phosphoric acid gives rise to variations in the product owing to the intrinsic difficulty of ensuring complete reaction.

The present invention provides a method of preparing phosphates of the said bivalent metals which avoids the aforementioned disadvantages, and which comprises preparing a substantially homogeneous aqueous solution containing alkaline earth metal ions and phosphate ions in the presence of a concentration of hydrogen ions sufficient to prevent precipitation, the solution also containing a hydrolysable amide such as urea or a hydrolysable urea derivative, and heating the solution to hydrolyse the urea, and thereby to reduce the concentration of hydrogen ions to a value at which homogeneous precipitation of the phosphate occurs. The urea hydrolyses to form ammonia and carbon dioxide, the latter is evolved while the former gradually reduces the hydrogen ion concentration of the solution. The method is especially suited to the preparation of the monoacid phosphate of calcium, strontium and barium, and can be applied to mixtures of these metals. The method can also be used to obtain the hydrogen phosphates of magnesium, cadmium and manganese.

The phosphate ions may conveniently be added in the form of a soluble phosphate, in particular ammonium phosphate, and the desired concentration of hydrogen ions can be developed by the addition of a mineral acid which forms a soluble salt with the bivalent metal, such as hydrochloric acid or nitric acid, or, in the case of cadmium or manganese, sulphuric acid.

The method according to the invention enables a process of purification by partial precipitation to be carried out, the solution being heated until the first slight precipitation occurs and then filtered, the filtrate being subsequently heated to effect complete precipitation. In this way traces of impurities can be removed which might otherwise be harmful in the preparation of a luminescent material. Alternatively, solutions of the individual reactants, for example ammonium phosphate, calcium chloride and urea, may be separately purified before being mixed to prepare the reaction solution.

The method can be adapted for continuous processing by metering the constituent solutions into a mixing vessel, from which the solution can flow continuously into a heating vessel or tube in which hydrolysis of the urea is effected and from which a slurry of precipitated phosphate flows to a filter.

The method according to the invention can be modified to carry out co-precipitation of calcium phosphate with the phosphates of the other metals of the said group, for example cadmium or manganese, or with other calcium salts such as the carbonate or oxalate.

The product of the method according to the invention is characterised by a more perfect and uniform crystallinity, and is therefore more easily washed and filtered, and is in a physical condition especially suited to phosphor production. In the case of calcium hydrogen phosphate, the precipitate recovered from a boiling solution is in the anhydrous form, whereas other precipitation methods can yield, for example, $CaHPO_4 \cdot 2H_2O$ which may be only partially dehydrated on drying. Moreover, despite every care, analysis of batches of conventionally precipitated calcium hydrogen phosphate usually reveal variations in the ratio of $Ca:PO_4$, but batches prepared according to the invention have a much more constant $Ca:PO_4$ ratio from batch to batch, the calcium content usually being 29.2% by weight. Luminescent materials can be prepared by any conventional method from the products of the method according to the invention, and can be significantly brighter than corresponding materials prepared from conventionally prepared phosphates.

The invention will be further described with reference to the following example.

The following solutions are prepared:

Solution A: 495 g. $(NH_4)_2HPO_4$ dissolved in water and the solution made up to 1.5 litres with water.
Solution B: 810 g. $CaCl_2 \cdot 6H_2O$ dissolved in water and the solution made up to 1.5 litres with water.
Solution C: 1250 g. urea dissolved in water and the solution made up to 4 litres with water.

1040 ml. Solution A, 320 ml. hydrochloric acid (sp. gr. 1.18), 1040 ml. Solution B and 800 ml. Solution C are mixed together in the order given, and stirred. The bulked solution is then heated to boiling with continuous stirring until precipitation of $CaHPO_4$ is complete. Three hours boiling usually suffices. The precipitate is filtered off, washed with cold water and dried.

A 4-foot, 40-watt fluorescent lamp coated with a 3500° K. calcium halophosphate phosphor produced from calcium hydrogen phosphate so obtained had a brightness of 72 lumens per watt in contrast to 69 lumens per watt obtained with an otherwise identical phosphor produced from calcium hydrogen phosphate prepared in a conventional manner.

We claim:
1. A method of preparing a hydrogen phosphate of a bivalent metal selected from the group consisting of magnesium, calcium, strontium, barium, cadmium and manganese, the method comprising preparing a substantially homogeneous aqueous solution containing ions of said metal, ammonium phosphate, a mineral acid which forms a soluble salt with said metal and is selected from the group consisting of hydrochloric, nitric and sulphuric acids, and a hydrolysable amide selected from the group consisting of urea and urea derivatives, said acid being present in a concentration sufficient to prevent the precipitation of said metal phosphate, and heating said solution to hydrolyse said amide and thereby to reduce the concentration of hydrogen ions in said solution to a value at which homogeneous precipitation of said metal phosphate occurs.

2. A method according to claim 1 wherein said metal is an alkaline earth metal of the group comprising calcium, strontium and barium.

3. A method according to claim 1 wherein said solution is first heated until slight precipitation occurs and is thereafter filtered and subsequently further heated to effect complete precipitation.

4. A method of preparing the anhydrous monoacid phosphate of an alkaline earth metal of the group consisting of calcium, strontium and barium, the method comprising preparing an aqueous solution containing ions of said alkaline earth metal, ammonium phosphate, a mineral acid which forms a soluble salt with said metal, and a hydrolysable amide selected from the group consisting of urea and urea derivatives, said acid being present in a concentration sufficient to prevent the precipitation of said phosphate, and heating said solution substantially to its boiling point to hydrolyse said amide and thereby to reduce the concentration of hydrogen ions in said solution to a value at which homogeneous precipitation of said monoacid phosphate occurs.

5. A method according to claim 4 wherein said solution is first heated until slight precipitation occurs and is thereafter filtered and subsequently further heated to effect complete precipitation.

6. A method according to claim 1 wherein aqueous solutions of the constituents necessary to form said homogeneous solution are metered into a mixing vessel, said constituent solutions are mixed in said mixing vessel, the resulting homogeneous solution is conducted continuously into a heated reaction vessel in which precipitation is effected, and the resulting slurry of precipitated phosphate is conducted from said reaction vessel to a filter.

7. A method of preparing calcium hydrogen phosphate, said method comprising: preparing a substantially homogeneous aqueous solution containing calcium ions, ammonium phosphate, a mineral acid which forms a soluble salt with calmium and is selected from the group consisting of hydrochloric, nitric and sulfuric acids, and a hydrolyzable amide selected from the group consisting of urea and urea derivatives, said acid being present in a concentration sufficient to prevent the precipitation of calcium phosphate, and heating said solution to hydrolyze said amide and thereby to reduce the concentration of hydrogen ions in said solution to a value at which homogeneous precipitation of said metal phosphate occurs.

References Cited in the file of this patent

UNITED STATES PATENTS 2,946,656    Schreuns _____ July 26, 1960

OTHER REFERENCES

MacIntire et al.: Industrial and Engineering Chemistry, vol. 37, February 1945, pages 164–169.